United States Patent [19]

Benson et al.

[11] Patent Number: 5,639,436
[45] Date of Patent: Jun. 17, 1997

[54] EXOTHERMIC TWO-STAGE PROCESS FOR CATALYTIC OXIDATION OF HYDROGEN CHLORIDE

[75] Inventors: Sidney W. Benson, Brentwood; Ronald G. Minet, Los Angeles; Max K. Mortensen, Walnut; Theodore T. Tsotsis, Huntington Beach, all of Calif.

[73] Assignee: University of Southern California, Los Angeles, Calif.

[21] Appl. No.: 526,258

[22] Filed: Sep. 21, 1995

[51] Int. Cl.$^6$ ............................................. C01B 7/04
[52] U.S. Cl. .............................. 423/502; 423/507
[58] Field of Search ............................ 423/502, 507, 423/493, 604

[56] References Cited

U.S. PATENT DOCUMENTS

| | | | |
|---|---|---|---|
| 2,333,845 | 11/1943 | Danforth | 423/507 |
| 2,436,870 | 3/1948 | Murphree | 423/507 |
| 2,448,255 | 8/1948 | De Benedictis et al. | 423/502 |
| 2,542,961 | 2/1951 | Johnson et al. | 423/502 |
| 2,577,808 | 12/1951 | Pye et al. | 423/502 |
| 2,987,378 | 6/1961 | Thoma | 423/507 |
| 3,332,742 | 7/1967 | Metaizeau | 423/507 |
| 3,383,177 | 5/1968 | Metaizeau | 423/502 |
| 4,119,705 | 10/1978 | Riegel et al. | 423/507 |
| 4,774,070 | 9/1988 | Itoh et al. | 423/502 |
| 4,959,202 | 9/1990 | Minet et al. | 423/502 |
| 4,994,256 | 2/1991 | Minet et al. | 423/502 |
| 5,154,911 | 10/1992 | Benson et al. | 423/502 |

FOREIGN PATENT DOCUMENTS

| | | |
|---|---|---|
| 1068676 | 10/1957 | Germany. |
| 1-257102 | 10/1989 | Japan. |

OTHER PUBLICATIONS

J. A. Allen et al., "Oxychlorination Catalysts", Reviews of Pure and Applied Chemistry, vol. 21, 1971, pp. 145–166 (No Month).

Primary Examiner—Ngoc-Yen Nguyen
Attorney, Agent, or Firm—William W. Haefliger

[57] ABSTRACT

A process of recovering chlorine from a stream of hydrogen chloride comprising the steps of exothermically reacting a stream of hydrogen chloride and oxygen with a fluidized bed of a carrier catalyst containing cupric oxide and cupric chloride in a reaction zone within a chlorinator reactor at temperatures between 150° and 220° C. to convert part of the cupric oxide to cupric chloride and cupric hydroxychloride, thereby essentially eliminating the hydrogen chloride to produce a product stream including chlorine, residual oxygen, inerts and water, which is removed from the chlorinator reactor; passing the resulting carrier catalyst containing cupric chloride, cupric hydroxychloride, and residual cupric oxide from the chlorinator reactor to the combination oxidation reactor to form a bed which is operated at temperatures between 300° and 400° C., wherein the combination oxidation reactor is supplied with a stream a hydrogen chloride and oxygen to fluidized the bed, and for exothermic reaction with cupric chloride and cupric hydroxychloride to produce cupric oxide which is returned to the chlorinator reactor; supplying the overhead stream of chlorine, unreacted hydrogen chloride, inerts and residual oxygen from the combination oxidation reactor to the chlorinator reactor to cause hydrogen chloride therein to react with the cupric oxide in the carrier catalyst at the operating temperature between 150° and 220° C.; the product stream from the chlorinator reactor being chlorine rich but substantially free of hydrogen chloride.

9 Claims, 6 Drawing Sheets

OXIDIZER — CHLORINATOR

400 C — 200 C

BASIS 1000 Kg/hr. HCL

**BLOCK DIAGRAM AND MATERIAL BALANCE
TWO-STAGE EXOTHERMIC HCL OXIDATION PROCESS**

| Component | Inlet kg/hr | A * | Outlet kg/hr | B * | Product kg/hr |
|---|---|---|---|---|---|
| HCl | 1000 | | 399 | 399 | |
| $O_2$ | 440 | 220 | 220 | | 220 |
| $N_2$ | 44 | | 44 | | 44 |
| $Cl_2$ | | | 974 | | 974 |
| $H_2O$ | | | 246 | | 246 |
| | | 1484 | 1883 | | 1484 |

*Represents content of component being transferred with solid catalyst.

Fig. 2.

ECONOMIC FACTORS FOR THE CATALYTIC OXIDATION CARRIER PROCESS

CAPACITY: 60,000 METRIC TONS PER YEAR OF CHLORINE PRODUCT

| PLANT INVESTMENT | $ MM |
|---|---|
| Catalytic Carrier Section | 5.0 |
| Chlorine Recovery | 2.5 |
| Waste Heat Recovery Steam Generation | 2.0 |
| Miscellaneous | 3.0 |
| Total Inside Battery Limits Cost | $12.5 |

| OPERATING COST | $/Metric Ton $Cl_2$ Product |
|---|---|
| Capital Charges @ 20% | 42 |
| Utilities (Fuel, Power, Oxygen) | 16 |
| Chemicals and Catalysts | 4 |
| Labor and Overhead | 6 |
| Maintenance @ 5% Capital | 10 |
| Total Cost of Production | $78/Metric Ton |

FIG. 5.

CATALYTIC OXIDATION PROCESS
TWO-STAGE CIRCULATING FLUIDIZED BED DATA
SOLIDS CIRCULATING RATE 5-20 GMS/MIN
300-400 GMS CW ON ZEOLITE CATALYST
HCL OXIDATION
COP MODE

Reactor 1

| Reaction | COP | COP | COP |
|---|---|---|---|
| Temperature C | 200 | 200 | 200 |
| Nitrogen flow, ml/min | 450 | 450 | 450 |
| Oxygen flow, ml/min | 85 | 85 | 85 |
| HCl flow, ml/min | 70 | 70 | 70 |
| HCl out, ml/min | 0 | 0 | 0 |
| % HCl Recovery | 100 | 100 | 100 |

Reactor 2

| | | | |
|---|---|---|---|
| Temperature C | 400 | 400 | 400 |
| Sample Time, Min | 30 | 30 | 30 |
| HCl flow, ml/min | 150 | 150 | 150 |
| Oxygen flow, ml/min | 75 | 100 | 150 |
| Nitrogen flow, ml/min | 325 | 300 | 250 |
| Chlorine out, Moles | 0.11 | 0.12 | 0.12 |
| HCl out, Moles | 0.091 | 0.082 | 0.065 |
| % Chlorine Recovery | 71 | 75 | 79 |
| Total Moles of HCl | 0.311 | 0.322 | 0.305 |
| HCl Out Flow R2, ml/min | 68 | 61 | 48.5 |

5,639,436

EXOTHERMIC TWO-STAGE PROCESS FOR CATALYTIC OXIDATION OF HYDROGEN CHLORIDE

BACKGROUND OF THE INVENTION

This invention is useful in apparatus and process for the recovery of chlorine from waste or byproduct hydrogen chloride, by means of a multistage, continuous reaction exothermic process employing a combined catalytic carrier system. Hydrogen chloride is produced as a byproduct from many chemical processes, including production of titanium dioxide pigment, polyurethanes, epichlorohydrin, vinyl chloride, organic chlorides, and many other useful and economically important substances. Typically, the chlorine used in the primary chemical process is supplied from large-scale electrochemical plants by shipment via rail, truck or barge. The byproduct hydrogen chloride is usually considered to be an environmental toxic substance and must be collected and disposed of by sale at reduced price or by neutralization with some form of lime or caustic, which must be disposed of as landfill.

The herein described invention makes it possible to oxidize the hydrogen chloride to produce chlorine for recycle to the primary chemical process in an economical and environmentally sound manner, and in a two-step process carried out under exothermic conditions, to recover the chlorine for use in the primary process, thus materially reducing the quantity which must be shipped from outside, and producing useful heat, and at a cost which is significantly below the cost of fresh chlorine.

SUMMARY OF THE INVENTION

Basically, a major object is to provide a normal process of continuously recovering chlorine from a stream of hydrogen chloride, and that includes the steps:

a) providing at least two reactors, including an oxidation reactor and a chlorinator reactor, and providing fluidized beds of a carrier catalyst containing cupric oxide and cupric chloride in reaction zones within the reactors, b) supplying a stream of hydrogen chloride and oxygen to each reactor, c) the stream reacting in the chlorinator reactor with the fluidized bed of carrier catalyst cupric oxide and cupric chloride at temperatures between 150° and 220° C. exothermically to convert part of the cupric oxide to cupric chloride, and cupric hydroxychloride, thereby essentially eliminating the hydrogen chloride to produce a product stream including chlorine, oxygen, inerts and water, which is removed from the chlorinator reactor, and d) passing a stream of fluidized carrier catalyst containing cupric chloride, cupric hydroxy chloride, and residual cupric oxide from the chlorinator reactor, to be supplied to the combination reactor in a bed operating at temperatures between about 300° and 400° C., wherein the combination reactor is supplied with a stream of hydrogen chloride and oxygen to fluidize the bed, and for exothermic reaction with cupric chloride and cupric hydroxy chloride to produce cupric oxide and an overhead stream of chlorine, unrecovered hydrogen chloride, inerts, water, and residual oxygen, e) feeding the carrier catalyst stream containing cupric oxide to the chlorinator reactor for reaction with hydrogen chloride, as defined in c), and f) supplying the overhead stream of chlorine, hydrogen chloride, inerts, water, and oxygen from the combination reactor to the chlorinator reactor to cause hydrogen chloride therein to react with the cupric oxide in the carrier catalyst at the operating temperature between 150° and 220° C., g) the product stream from the chlorinator reactor being chlorine rich but substantially free of hydrogen chloride.

Another object is to provide reactions in two steps that are carried out under exothermic conditions, thus giving a highly economic process that will not require outside fuel. The steps include recycle of catalyst of controlled composition with respect to "copper chloride", copper oxide and various copper oxy chloride complexes. Both stages are typically supplied with hydrogen chloride and oxygen.

Another object is to provide generation of heat and production of high-pressure steam in both stages, and which is in sufficient quantity to power oxygen compressors, refrigeration compressors, and produce net electric power for the overall process.

A further object is to provide conditions of operation that result in a chlorine product, which is free from hydrogen chloride, and which includes a secondary recovery system that separates the water without producing aqueous hydrochloric acid, by using an adsorbent regenerative dryer or an alternate liquid dehydration system with heat recovery from the two-stage process, to provide the necessary separating energy for regeneration of the dehydration agent.

An additional object is to provide another recovery step in which chlorine is separated from remaining non-condensable gas, such as nitrogen, argon, and oxygen, by the use of a specially-designed adsorbent, or liquid absorbent system. As will be seen, the overall process is low in investment cost, and less prone to corrosion, and low in operating cost, producing reclaimed chlorine at a cost significantly below the cost of fresh input chlorine.

Of importance is the fact that from an overall process point of view, the catalytic carrier chlorination step is used in a way to recycle the hydrogen chloride which appears in the combination reactor effluent, within the system, giving a product chlorine stream free from hydrogen chloride. In this regard, a major problem in a single stage catalytic oxidation process is the limit on hydrogen chloride conversion imposed by the equilibrium constraint to approximately 60% to 70% under reasonable operating conditions. By combining the single stage oxidation reactor with the catalytic carrier process as the second stage, a synergistic integration results with the off gas from the first stage being purified by the chlorination step in the second stage catalytic carrier process.

This invention improves upon the disclosure of U.S. Pat. No. 4,959,202, and of U.S. patent application Ser. No. 08/338,858, those disclosures incorporated herein by reference as background.

These and other objects and advantages of the invention, as well as the details of an illustrative embodiment, will be more fully understood from the following specification and drawings, in which:

DRAWING DESCRIPTION

FIG. 2 is a tabulation of process economic factors;

FIG. 4 is a chlorine recovery system;

FIG. 5 is a summary of experimental data; and

DETAILED DESCRIPTION

The process of this invention makes use of a carrier catalyst system having metallic elements in the form of complex oxides and chlorides impregnated onto a carrier mass, such as alumina, silica, zeolite, or molecular sieve material of such a form as to be suitable for use in a multistage fluidized bed system. The chemical reactions are caused to take place in a series of steps which include:

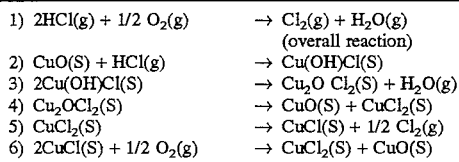

Figure 1:
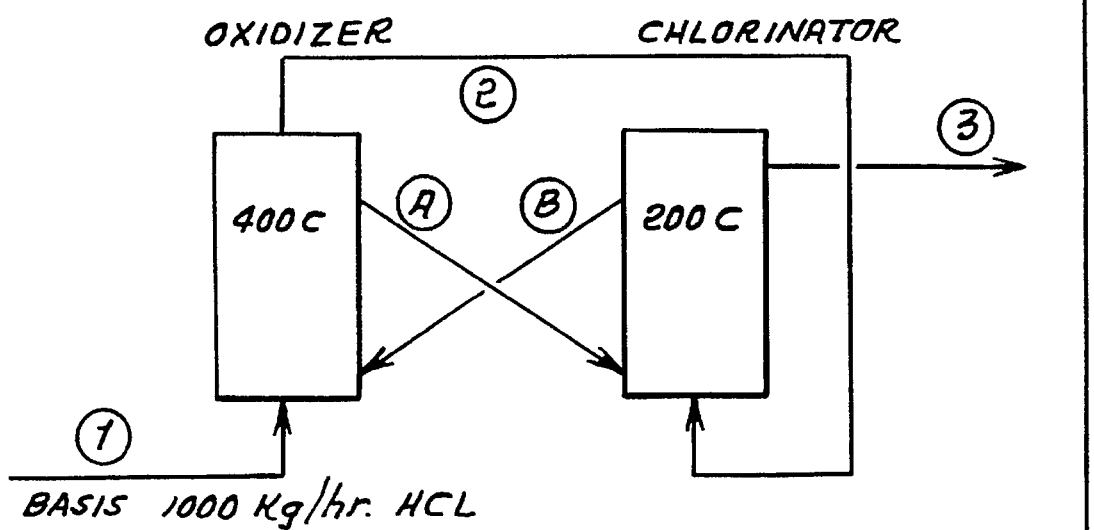
FIG. 1 is a block flow diagram with associated material balance listing.
Figure 3:
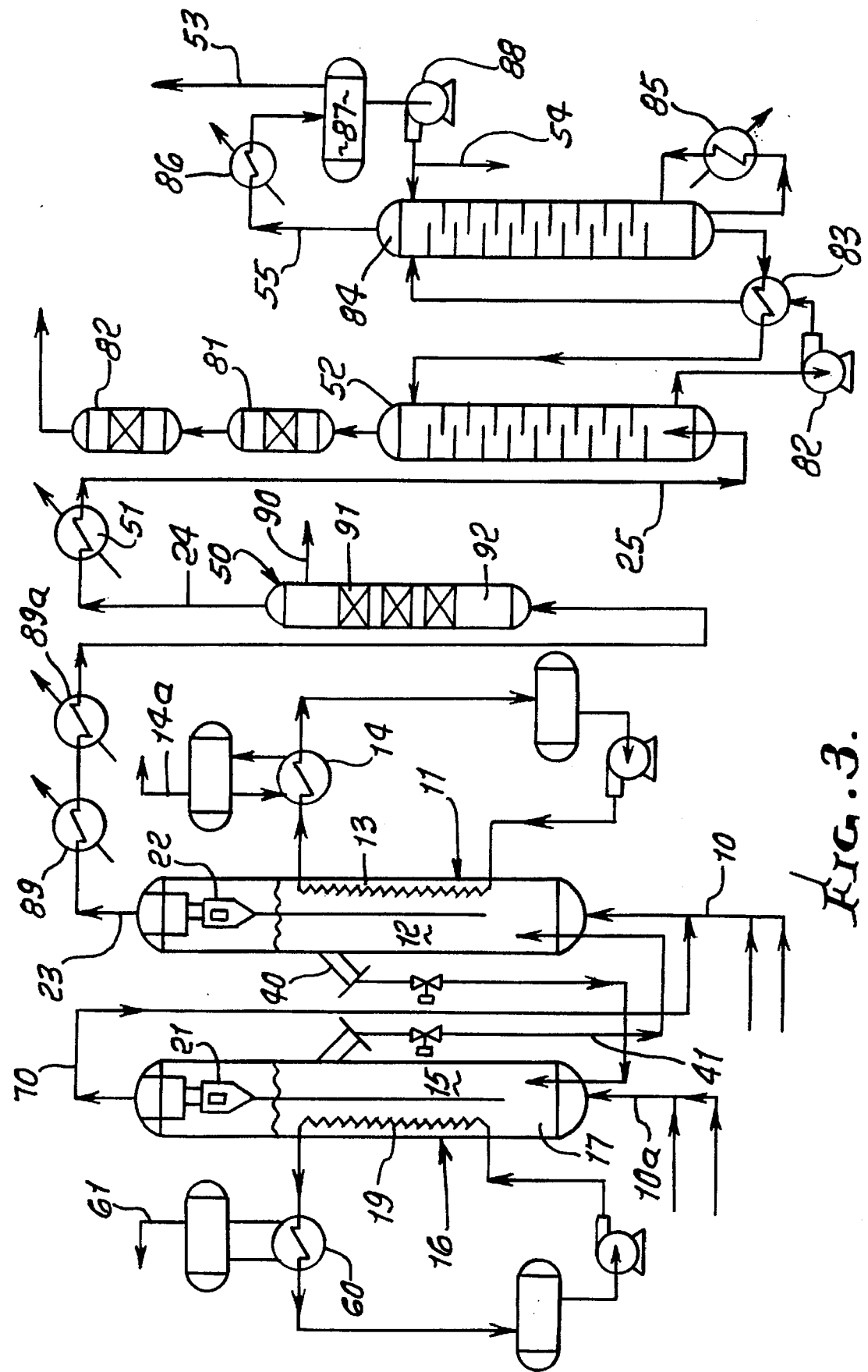
FIG. 3 is a process flow diagram.
Figure 9:
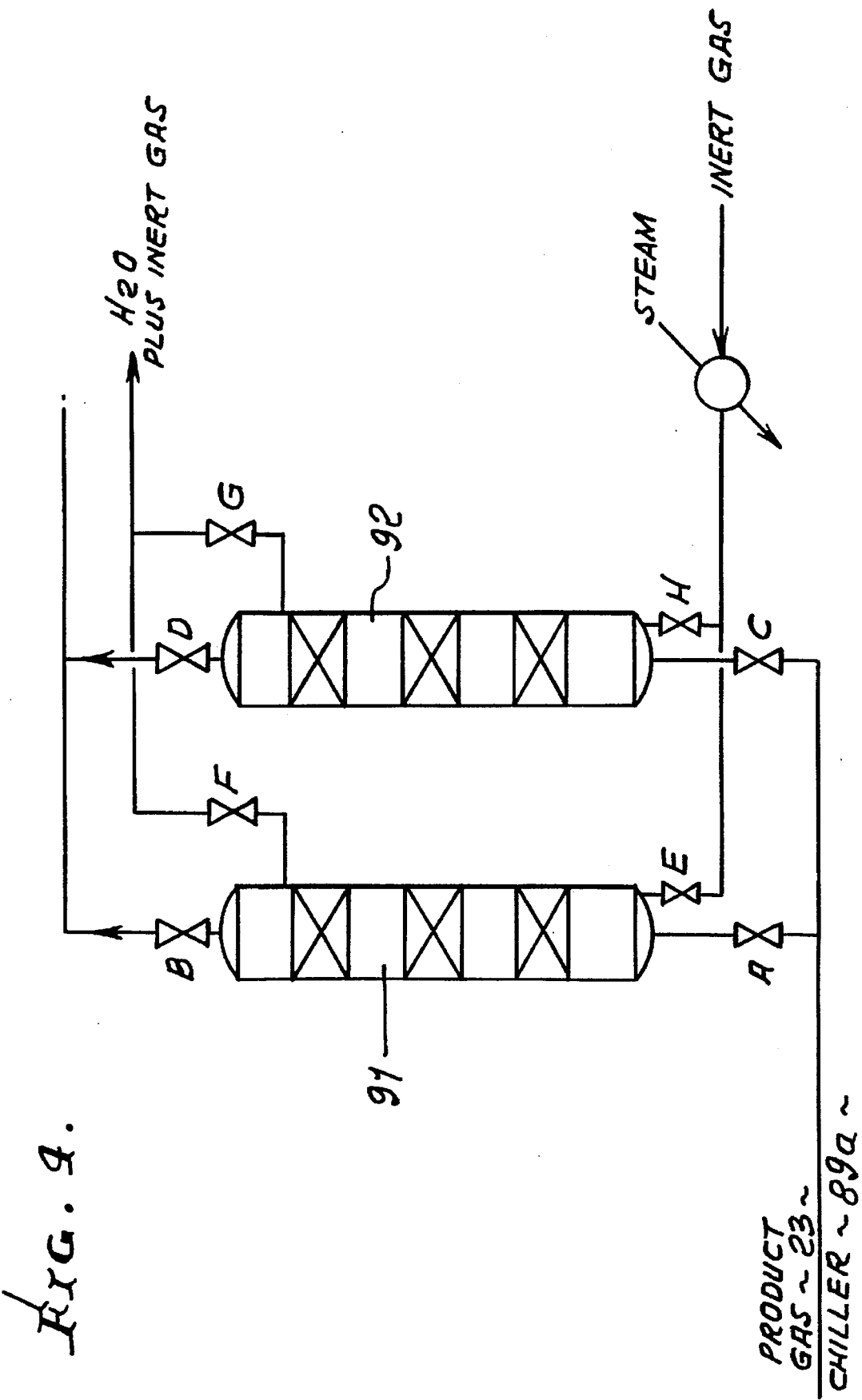

1) $2HCl(g) + 1/2\ O_2(g) \rightarrow Cl_2(g) + H_2O(g)$ (overall reaction)
2) $CuO(S) + HCl(g) \rightarrow Cu(OH)Cl(S)$
3) $2Cu(OH)Cl(S) \rightarrow Cu_2O\ Cl_2(S) + H_2O(g)$
4) $Cu_2OCl_2(S) \rightarrow CuO(S) + CuCl_2(S)$
5) $CuCl_2(S) \rightarrow CuCl(S) + 1/2\ Cl_2(g)$
6) $2CuCl(S) + 1/2\ O_2(g) \rightarrow CuCl_2(S) + CuO(S)$ These specific steps take place in specific reaction zones and within specific temperature ranges, as described on the block diagram, FIG. 1, and as seen in FIG. 3, and in the following steps:

Step 1. The stream 10 of oxygen, air, and of hydrogen chloride, either anhydrous or containing water and process impurities, which might be present, is passed into chlorinator reactor 11 through a fluidized bed 12 of carrier catalyst of copper oxides and copper chlorides with sodium chlorides, deposited on a suitable carrier in a 1:1 molar ratio. Reactions 2, 3, and 4 for the formation of complex chlorides take place at a temperature maintained in the range of 150° to 220° C. by providing a system 13 of heat transfer within the bed 12, which carries away the exothermic heat of reaction via, in a preferred arrangement, a heat exchanger 14 generating steam at 14a to improve the thermal economy of the process. Heat transfer fluid used at 13 and 14 is typically boiler feed water of required purity and pressure.

Chlorinated catalytic material is continuously withdrawn at 40 from the first reactor in particulate form and transferred into the fluidized bed 15 in a second reactor 16 wherein step 2 takes place.

Step 2. Stream 10a of oxygen, air and of hydrogen chloride, either anhydrous or containing water and process impurities, is passed into second, i.e., combination oxidation reactor 16 through fluidized bed 15, and the above reactions 2 through 6 take place to convert the complex chlorides to cupric oxide and cupric chloride, and release chlorine gas. The fluidized bed 15 in reactor 16 is blown with the gaseous mixture 10a of HCl and of oxygen and nitrogen ranging from 100% oxygen down to 20% oxygen entering the reactor at 17. The reactor 16 is maintained at a temperature between 300° and 400° C. by means of withdrawal of exothermically-produced heat via a system of heat transfer 19 within the fluidized bed 15. Heat transfer occurs at 60, and steam is produced at 61. Heat transfer fluid used at 19 and 60 is typically boiler feed water of proper composition and pressure.

The gas and catalyst composition and temperature in reactor 16 result in a chemically equilibrium limited conversion by oxidation of hydrogen chloride to chlorine, leaving a significant quantity of hydrogen chloride which must be removed (see FIG. 5) to improve the overall conversion of the feed hydrogen chloride to chlorine, and to avoid contamination of the chlorine product.

The gas and catalyst composition and temperature in reactor 16 result in an equilibrium limited conversion of hydrogen chloride to chlorine leading to the presence of a certain amount of hydrogen chloride in the exit gas (see FIG. 5 table), which must be removed to improve the overall conversion of the feed hydrogen chloride to chlorine, and to avoid contamination of the chlorine product.

This removal is accomplished by step 3, the recycle at 70 of the hydrogen chloride bearing gas stream to reactor 11. A continuous stream of carrier catalyst containing cupric oxide and complex copper chlorides is withdrawn through line 41 and returned to bed 12 in the first reactor.

Step 3. The total flow of hot gas from the second reactor containing chlorine, oxygen, nitrogen, and unconverted hydrogen chloride is recycled to the first reactor 11 and the fluidized bed 12, where the contained hydrogen chloride reacts with cupric oxide returned from the second reactor 16 through 41. At the temperature conditions selected for the first fluidized bed 12, 150° to 220° C., only the hydrogen chloride reacts, the oxygen, nitrogen, water, and chlorine passing through without change. Note that reactor 12 and reactor 15 are equipped with internal dust-collecting cyclones 21 and 22, to remove catalytic dust from the exit gases and return the dust to the fluidized beds.

Step 4. Effluent gases leaving the first reactor at 23 consist of chlorine, water, oxygen, and nitrogen, which pass off to heat exchange at 89 and 89a, and to recovery system 50, for removal of water, a chiller 51, and a system for removal of chlorine at 52, and chlorine product gas at 53 and liquid chlorine at When operated as described, over 99% of the hydrogen chloride 10 and 10a entering the system is recovered as chlorine product 53 and 54, gas or liquid as described in step 5.

Step 5. The gases leaving the chlorination reactor 11 pass through cooler 89 and chiller 89a to reduce the temperature level before entering the dehydrator 50, where a regenerative system utilizing multiple contact with solid adsorbents or liquid absorbent dehydrators 91 as may be selected in a particular case. The active dehydrators remove the water from the chlorine, oxygen and nitrogen-bearing gases for later expulsion from the system 92 using a suitable means of thermal regeneration 92. Schematic diagram FIG. 4 is provided solely to illustrate a possible regenerative dehydrated system, which could use steam generated in the heat recovery portions of the main catalytic reactor system 14a.

Referring to FIG. 4, the product gas 23 from the catalytic section enters the dehydration system 50 through a valve manifold, which will direct the flow through either the dehydrator 91 or the water stripper 92 by proper positioning of automatic valves A, B, C, D, E, F, G, and H, passing through one or the other vessels in sequence. Dehydrated gas from either 91 or 92 will pass through an additional chiller 51. Water removed from the gas is retained in the multi-staged adsorbent or absorbent materials until regeneration by contact with heated inert gas passed through the two vessels in sequence, to remove the water for venting and disposal.

Chilled, dehydrated gas 24 passes through the cluster 51 and enters the chorine absorber 52 at 25 where contact with a selective solvent absorbs the chlorine in a multistage contacting system. Chlorine-free gas, consisting essentially of nitrogen and residual oxygen, passes through guard beds 81 and 82 for adsorption of trace quantities of chlorine, which is later removed. The exit gas from the guard bed may be vented to the atmosphere or recycled for utilization of the remaining oxygen if high purity oxygen has been used in the process.

From the bottom of the absorber 52, the chlorine-bearing solvent is pumped 82 through a heat exchanger 83 and delivered to a stripper 84, where chlorine is separated by raising the solvent temperature with the steam heated reboiler 85. Chlorine-free solvent flows from the bottom of the stripper and passes through heat exchanger 83 back to the chlorine absorber 52 in a continuous fashion. The chlorine 55, removed from the solvent in the stripper, flows into the chiller 86 where the partially condensed liquid is separated in the reflux drum 87 and pumped 88 back to the stripper 84 with a portion of the liquid chlorine flowing to product storage 54. Uncondensed chlorine gas 53 is delivered to the product line for recycle to the original chlorine-consuming plant which generated the hydrogen chloride or for some alternate chemical use.

Since both the single stage oxidation step and the chlorination steps are exothermic, there is no need for an external source of heat, saving a significant quantity of fuel and capital investment. Heat available from the reactors typically produces a positive energy flow in the form of high-pressure, superheated steam, which can be used to drive compressors, and generate electric power required for pumps and other systems, making the overall operating cost attractively low.

As further evidence of the unique nature of this two-stage process, which was discovered during the execution of laboratory experiments, FIG. 5 is presented to illustrate the specific result of combining hydrogen chloride and oxygen as the feed stream to fluidized bed reactors containing a circulating stream of particulate materials passing between the two reactors, one of which is operating at 360° to 400° C., wherein the hydrogen chloride is partially converted, as limited by chemical equilibrium, 40% to 70% by weight to chlorine, as is well known for the well-documented Deacon process, and providing for the unique new invention of passing the total effluent stream of hydrogen chloride, chlorine, residual oxygen, nitrogen, and newly-produced water vapor into a second fluidized bed reactor operating between 150° and 220° C.

Only the hydrogen chloride reacts with the catalytic material to form cupric oxychloride and other complex copper compounds resulting in the elimination of the hydrogen chloride from the gas stream and permitting the delivery of exit gases from the low temperature reactor to a chlorine recovery system without requiring further treatment for removal of hydrogen chloride.

The process will work in the same manner if the water vapor is removed as the gas passes between the two reactors; however, this step is not necessary for the process to operate properly.

This discovery has been confirmed in the operation of a 4 kg/hr chlorine product pilot plant on a continuous basis. Both reactors operate in the exothermic range of the reaction leading to the generation of significant energy in the form of high-pressure steam or other suitable heat-recovery medium. Hydrogen chloride, reacting with the fluidized copper-based catalyst, to form a complex solid compound, is carried from the low-temperature reactor to the high-temperature reactor, where it is converted to chlorine. The recycle of hydrogen chloride in this manner results in the overall conversion of 100% of the feed hydrogen chloride into chlorine with a simple, two-stage exothermic system.

The combination of these two reactors, with the circulation of catalyst between the two exothermic steps differs significantly from the process described in the recent application Ser. No. 08/338,858, which makes use of a separate oxidation reactor operating in an endothermic regime and requiring significant heat in part from an external source, and differs from U.S. Pat. No. 4,959,202 for the same reason.

Figure 6:
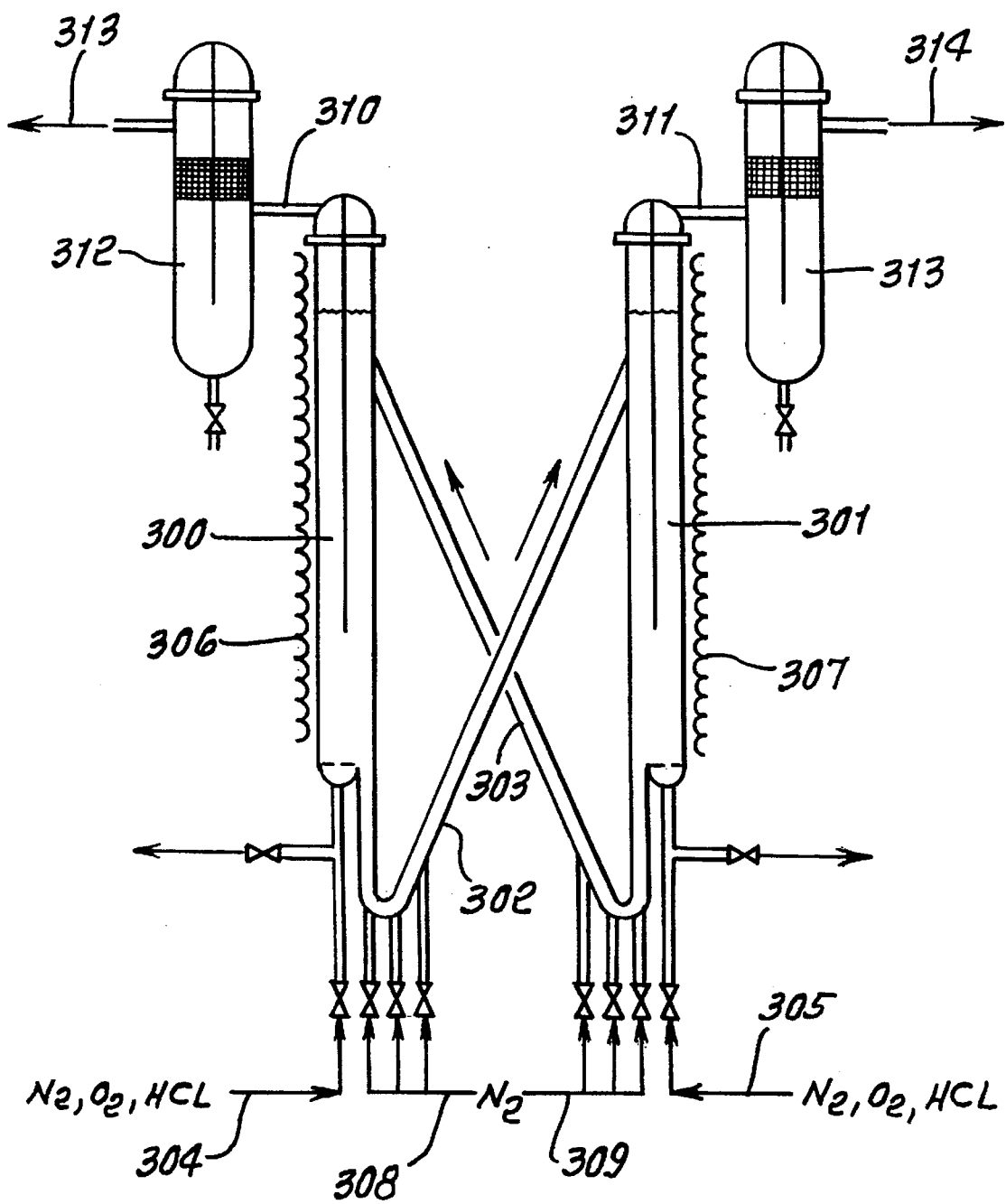
FIG. 6 is a sketch of the experimental laboratory apparatus.

The experimental data given in FIG. 5 was obtained by operating a circulating fluidized bed bench scale unit, FIG. 6, equipped to analyze the inlet and outlet gases to prove the overall concept.

The apparatus shown in FIG. 6 consists of two 25 mm quartz reactors 300 and 301 connected with up flow transport tubes 302 and 303 for movement of the catalyst between the 400C oxidation step at 301, and the 200C chlorination step at 300. Each reactor is supplied with controlled flow of hydrogen chloride, oxygen and nitrogen. See arrows 304 and 305. The temperature is maintained at the required level by temperature-controlled electric heating tapes 306 and 307. Flow of catalyst between the reactors is moved by nitrogen injection at multiple points in the transport tubes. See 308 and 309. Exit gases from the reactors at 380 and 381 pass through dust knockout vessels 312 and 313, and to analysis for hydrogen chloride and chlorine, and pass to the vent hood for disposal. See arrows 313 and 314. Total flow rates of the order of 500 ml/min of gas enters each reactor. Solid circulation rates of 5 to 20 gms per minute are typically provided.

As an illustration of the economic factors for the invention, an engineering design was prepared for a plant processing 60,000 tons per year of anhydrous hydrogen chloride and an operating cost was determined based on zero value for the byproduct hydrogen chloride feed. These results, as shown in FIG. 2, indicate a chlorine recovery cost of $78 per ton (1995 data) with a chlorine selling price of $230 per ton on the current market.

FIG. 2 lists process economic factors in terms of typical plant investment and operating cost.

The overall system, as described, provides for 7essentially 100% conversion of hydrogen chloride to chlorine. The product chlorine can be produced as a liquid or a gas stream of 99% plus purity. No toxic or noxious effluent streams are produced to be released to the atmosphere or ground water. Energy requirements of less than 30% of the standard electrochemical process were realized, as well as significantly less than reported consumptions for alternate proposed chlorine recovery process. FIG. 1 shows material balance data.

As stated in the disclosure of U.S. Pat. No. 4,959,202, the process can be carried out using a catalytic carrier where manganese oxides and chlorides are substituted for copper, with good results, where a chlorination reactor operates with temperature in the range of 250°–350° C., and a combination reactor operates with temperature of about 400°–450° C.

Iron oxides and chlorides can also be substituted.

Heat recovery and chlorine recovery from the product stream can be carried out as described in U.S. Pat. No. 4,959,202.

We claim:

1. In a process of recovering chlorine from a stream of hydrogen chloride, the steps that include:
   a) providing at least two reactors, including a chlorinator reactor and a combination oxidation reactor, and providing a fluidized bed of a carrier catalyst containing cupric oxide and cupric chloride in a reaction zone within the chlorinator reactor,
   b) supplying a stream of hydrogen chloride and oxygen-bearing gas to each reactor,
   c) reacting said stream of hydrogen chloride and oxygen-bearing gas in the chlorinator reactor with said fluidized bed of carrier catalyst containing cupric oxide and cupric chloride at temperatures between 150° and 220°

C. exothermically to convert part of the cupric oxide to cupric chloride, and cupric hydroxychloride, thereby essentially eliminating the hydrogen chloride to produce a product stream including chlorine, oxygen, inerts and water, which is removed from said chlorinator reactor, d) passing the carrier catalyst resulting from step (c) which contains cupric chloride, cupric hydroxy chloride, and residual cupric oxide from said chlorinator reactor to the combination oxidation reactor to form a bed which is operated at temperatures between about 300° and 400° C., wherein said combination oxidation reactor is supplied with said stream of hydrogen chloride and oxygen-bearing gas, to fluidize said bed, and for exothermic reaction with the cupric chloride and cupric hydroxy chloride in the carrier catalyst to produce cupric oxide and an overhead stream of chlorine, unreacted hydrogen chloride, inerts and residual oxygen, e) feeding the carrier catalyst resulting from step (d) containing cupric oxide to the chlorinator reactor for reaction with hydrogen chloride, as defined in c), f) supplying the overhead stream of chlorine, hydrogen chloride, inerts and oxygen from the combination oxidation reactor to the chlorinator reactor to cause hydrogen chloride therein to react with the cupric oxide in the carrier catalyst at the operating temperature between 150° and 220° C., g) said product stream from the chlorinator reactor being chlorine rich but substantially free of hydrogen chloride.

2. The method of claim 1 wherein heat is produced exothermically in both reactors and removed from both reactors for external use.

3. The method of claim 2 wherein heat removed from the reactors is used to produce superheated steam.

4. The method of claim 1 wherein said chlorine-rich product stream removed from the chlorinator reactor is subjected to processing for chlorine recovery, so that at least about 99% of the chlorine content of the hydrogen chloride supplied to said reactors is recovered as chlorine product.

5. The method of claim 1 wherein said carrier catalyst comprises a carrier selected from the group consisting of alumina, zeolite, silica, and molecular sieve.

6. The method of claim 1 including withdrawing heat from said product stream from said chlorinator reactor.

7. The method of claim 1 including controlling the supply of hydrogen chloride and oxygen to the reactors.

8. The method of claim 1, including the use of cyclone separators for the removal of fine particulate matter from the fluidized beds in the reactors as the product streams in step (c) and the overhead stream in step (f) exit from the reactors.

9. A process of recovering chlorine from a stream of hydrogen chloride comprising the steps of:

exothermically reacting a stream of hydrogen chloride and oxygen with a fluidized bed of a carrier catalyst containing cupric oxide and cupric chloride in a reaction zone within a chlorinator reactor at temperatures between 150° and 220° C. to convert part of the cupric oxide to cupric chloride and cupric hydroxychloride, thereby essentially eliminating the hydrogen chloride to produce a product stream including chlorine, residual oxygen, inerts and water, which is removed from the chlorinator reactor;

passing the carrier catalyst from the previous step containing cupric chloride, cupric hydroxychloride, and residual cupric oxide from the chlorinator reactor to the combination oxidation reactor to form a bed which is operated at temperatures between 300° and 400° C., wherein the combination oxidation reactor is supplied with a stream a hydrogen chloride and oxygen to fluidize the bed, and for exothermic reaction with the cupric chloride and cupric hydroxychloride in the carrier catalyst to produce cupric oxide which is returned to the chlorinator reactor;

supplying the overhead stream of chlorine, unreacted hydrogen chloride, inerts and residual oxygen which is produced from the combination oxidation reactor to the chlorinator reactor to cause hydrogen chloride therein to react with the cupric oxide in the carrier catalyst at the operating temperature between 150° and 220° C.;

the product stream from the chlorinator reactor being chlorine rich but substantially free of hydrogen chloride.

* * * * *